(12) United States Patent
Teranoshita

(10) Patent No.: US 7,710,584 B2
(45) Date of Patent: May 4, 2010

(54) IMAGE FORMING APPARATUS WITH CONTROLLER FOR STORING PRINT DATA ACCORDING TO CHARACTERISTIC VALUE

(75) Inventor: Masahide Teranoshita, Yokohama (JP)

(73) Assignees: Kabushiki Kaisha Toshiba, Tokyo (JP); Toshiba Tec Kabuhsiki Kaisha, Tokyo (JP)

(*) Notice: Subject to any disclaimer, the term of this patent is extended or adjusted under 35 U.S.C. 154(b) by 0 days.

(21) Appl. No.: 11/957,762

(22) Filed: Dec. 17, 2007

(65) Prior Publication Data

US 2008/0094658 A1 Apr. 24, 2008

Related U.S. Application Data

(60) Continuation of application No. 11/410,133, filed on Apr. 25, 2006, now Pat. No. 7,324,234, which is a division of application No. 10/036,527, filed on Jan. 7, 2002, now abandoned.

(51) Int. Cl.
*G06F 3/12* (2006.01)
*G06K 15/00* (2006.01)

(52) U.S. Cl. ........................ 358/1.1; 358/1.16
(58) Field of Classification Search .................. 358/1.1, 358/1.9, 1.11–1.18
See application file for complete search history.

(56) References Cited

U.S. PATENT DOCUMENTS

| 5,754,744 | A | * | 5/1998 | Matsumoto et al. | ........ | 358/1.13 |
| 7,324,234 | B2 | * | 1/2008 | Teranoshita | ................ | 358/1.15 |
| 2005/0088677 | A1 | * | 4/2005 | Hayashi | ..................... | 358/1.13 |

FOREIGN PATENT DOCUMENTS

| JP | 2000-207163 A | | 7/2000 |
| JP | 2000-209373 | | 7/2000 |
| JP | 2000209373 A | * | 7/2000 |
| JP | 2000-351254 A | | 12/2000 |

* cited by examiner

*Primary Examiner*—Thierry L Pham
(74) *Attorney, Agent, or Firm*—Foley & Lardner LLP

(57) ABSTRACT

An image forming apparatus is provided with a storage device having storage areas divided corresponding to a characteristic value allocated for each print requesting person. Upon receiving print data and a characteristic value from an external device, the image forming apparatus stores the print data into a storage area which has been allocated the same characteristic value as the received characteristic value. The image forming apparatus subjects print data stored in the storage areas in the storage device to image formation processing on a storage area basis.

6 Claims, 9 Drawing Sheets

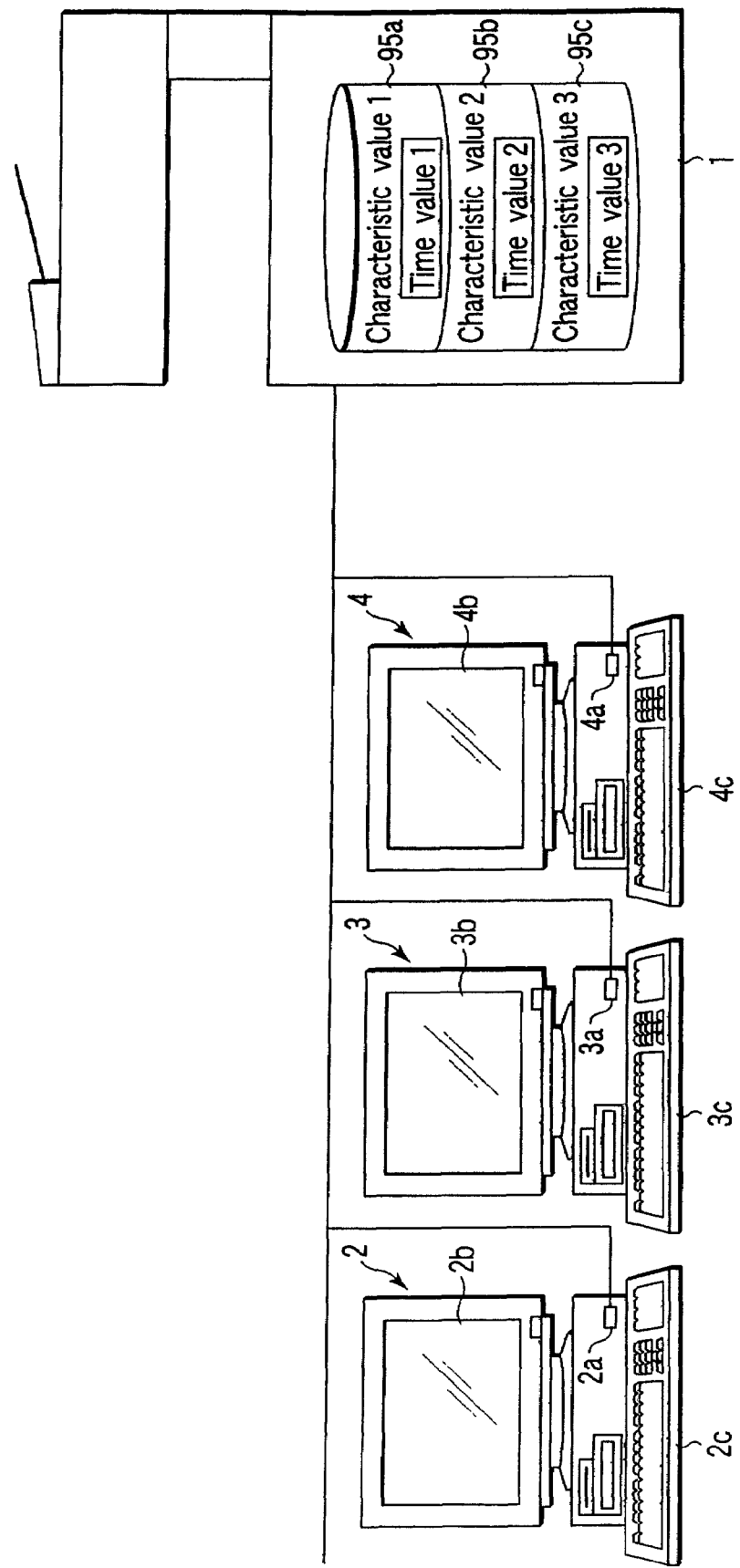
F I G. 4

IMAGE FORMING APPARATUS WITH CONTROLLER FOR STORING PRINT DATA ACCORDING TO CHARACTERISTIC VALUE

The present application is continuation of U.S. application Ser. No. 11/410,133, filed Apr. 25, 2006, which is a divisional of U.S. application Ser. No. 10/036,527, filed Jan. 7, 2002, the entire contents of which are incorporated herein by reference.

BACKGROUND OF THE INVENTION

The present invention relates to an image forming system having an image forming apparatus, such as a digital multiuse machine, that has various functions, such as scanner, printer, copy, fax, and network communications functions, etc.

Conventionally, image forming apparatuses, such as digital multiuse machines, have a function of printing print data from external devices connected by a network. Some of such digital multiuse machines have private printing and scheduled printing functions. With private printing, print data transmitted from the PC side is preserved in a storage device in the digital multiuse machine. After that, the print data stored in the storage device is printed in response to a user's print command on the digital multiuse machine. In scheduled printing, the printing start time specified from the PC side is stored in the storage device in the digital multiuse machine together with print data. The digital multiuse machine then prints the print data on the basis of the printing start time stored in the storage device.

However, in order to cause the digital multiuse machine to carry out print processing, private printing requires each of the print requesting users to operate the operating panel of the digital multiuse machine directly. In scheduled printing, in order to cause printing to be done at the specified time, it is required to set the printing start time each time a print request is made. When two or more users specify the same time, the digital multiuse machine carries out print processing in the order in which print data was accepted. For this reason, printouts for two or more users can be mixed up.

BRIEF SUMMARY OF THE INVENTION

It is an object of the invention to provide an image forming apparatus and an image forming system which permit print data sent from external devices to be printed in an efficient manner, and users' convenience to be increased.

An image forming apparatus of the invention, which is connected to an external device by which a request for printing can be set by a print requesting person, comprises a storage device having a plurality of storage areas corresponding to a characteristic value allocated for each print requesting person, an interface for receiving a print request from the external device, a controller for, when receiving a print request from the external device via the interface, storing print data in the print request into that storage area in the storage device which has been allocated the same characteristic value as the characteristic value in the print request, and an image forming unit for subjecting print data stored in the storage areas in the storage device to image formation processing on a storage area basis.

An image forming apparatus of the invention, which is connected to an external device by which a request for printing can be set by a print requesting person, comprises a storage device having storage areas divided by print start time, an interface for receiving a print request from the external device, a controller for, when receiving a print request from the external device via the interface, storing print data in the print request into that storage area in the storage device which has been allocated the same print start time as a print start time in the print request, a timer for counting the current time, and an image forming unit for subjecting print data stored in that storage area in the storage device which has been allocated a print start time that coincides with the current time counted by the timer to image formation processing.

An image forming apparatus of the invention, which is connected to an external device by which a request for printing can be set by a print requesting person, comprises a storage device having first storage areas divided by print start time, each first storage area being divided into second storage areas corresponding to a characteristic value, an interface for receiving a print request from the external device, a controller for, when receiving a print request from the external device via the interface, storing print data in the print request into, in a first storage area allocated the same print start time as a print start time in the print request, that second storage area which has been allocated the same characteristic value as a characteristic value in the print request, a timer for counting the current time, and an image forming unit for subjecting print data stored in the first storage area allocated a print start time that coincides with the current time counted by the timer to image formation processing on a second storage area basis.

An image forming apparatus of the invention, which is connected to an external device by which a request for printing can be set by a print requesting person, comprises storage means having a plurality of storage areas corresponding to a characteristic value allocated for each print requesting person, receiving means for receiving a print request from the external device, control means for, when receiving a print request from the external device via the receiving means, storing print data in the print request into a storage area which has been allocated the same characteristic value as the characteristic value in the print request, and image forming means for subjecting print data stored in the storage areas in the storage device to image formation processing on a storage area basis.

An image forming system of the invention has an external device by which a request for printing can be set by a print request person and an image forming apparatus connected to the external device, the external device comprises an operating device for setting a print request having a characteristic value allocated for a print requesting person and print data, and a first interface for sending a print request set by the operating device to the image forming apparatus, and the image forming apparatus comprises a storage device having a plurality of storage areas corresponding to a characteristic value allocated for each print requesting person, a second interface for receiving a print request from the external device, a controller for, when receiving a print request from the external device via the interface, storing print data in the print request into a storage area which has been allocated the same characteristic value as the characteristic value in the print request, and an image forming unit for subjecting print data stored in the storage areas in the storage device to image formation processing on a storage area basis.

An image forming system of the invention has an external device by which a request for printing can be set by a print request person and an image forming apparatus connected to the external device, the external device comprises an operating device for setting a print request having a print start time and print data, and a first interface for sending the print request set by the operating device to the image forming apparatus, and the image forming apparatus comprises a storage device having storage areas divided by print start time, a second interface for receiving a print request from the external device, a controller for, when receiving a print request from the external device via the interface, storing print data in the print request into a storage area which has been allocated the same print start time as the print start time in the print request, a timer for counting the current time, and an image forming unit for subjecting print data stored in that storage area in the storage device which has been allocated a print start time that coincides with the current time counted by the timer to image formation processing.

An image forming system of the invention has an external device by which a request for printing can be set by a print request person and an image forming apparatus connected to the external device, the external device comprises an operating device for setting a print request having a characteristic value allocated for a print requesting person and print data, a print start time and print data, and a first interface for sending a print request set by the operating device to the image forming apparatus, and the image forming apparatus comprises a storage device having first storage areas divided by print start time, each first storage area being divided into second storage areas corresponding to a characteristic value, a second interface for receiving a print request from the external device, a controller for, when receiving a print request from the external device via the second interface, storing print data in the print request into, in a first storage area allocated the same print start time as a print start time in the print request, that second storage area which has been allocated the same characteristic value as a characteristic value in the print request, a timer for counting the current time, and an image forming unit for subjecting print data stored in the first storage area allocated a print start time that coincides with the current time counted by the timer to image formation processing on a second storage area basis.

An image forming system of the invention has an external device by which a request for printing can be set by a print request person and an image forming apparatus connected to the external device, the external device comprises operating means for setting a print request having a characteristic value allocated for a print requesting person and print data, and transmitting means for sending a print request set by the operating means to the image forming apparatus, and the image forming apparatus comprises storage means having a plurality of storage areas corresponding to a characteristic value allocated for each print requesting person, receiving means for receiving a print request from the external device, control means for, when receiving a print request from the external device via the receiving means, storing print data in the print request into a storage area which has been allocated the same characteristic value as the characteristic value in the print request, and image forming means for subjecting print data stored in the storage areas in the storage device to image formation processing on a storage area basis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general description given below and the detailed description of the embodiment given below, serve to explain the principles of the invention.

FIG. 4 is a schematic illustration of an arrangement of the HDD in the digital multiuse machine 1 according to a first embodiment;

DETAILED DESCRIPTION OF THE INVENTION

Figure 1:
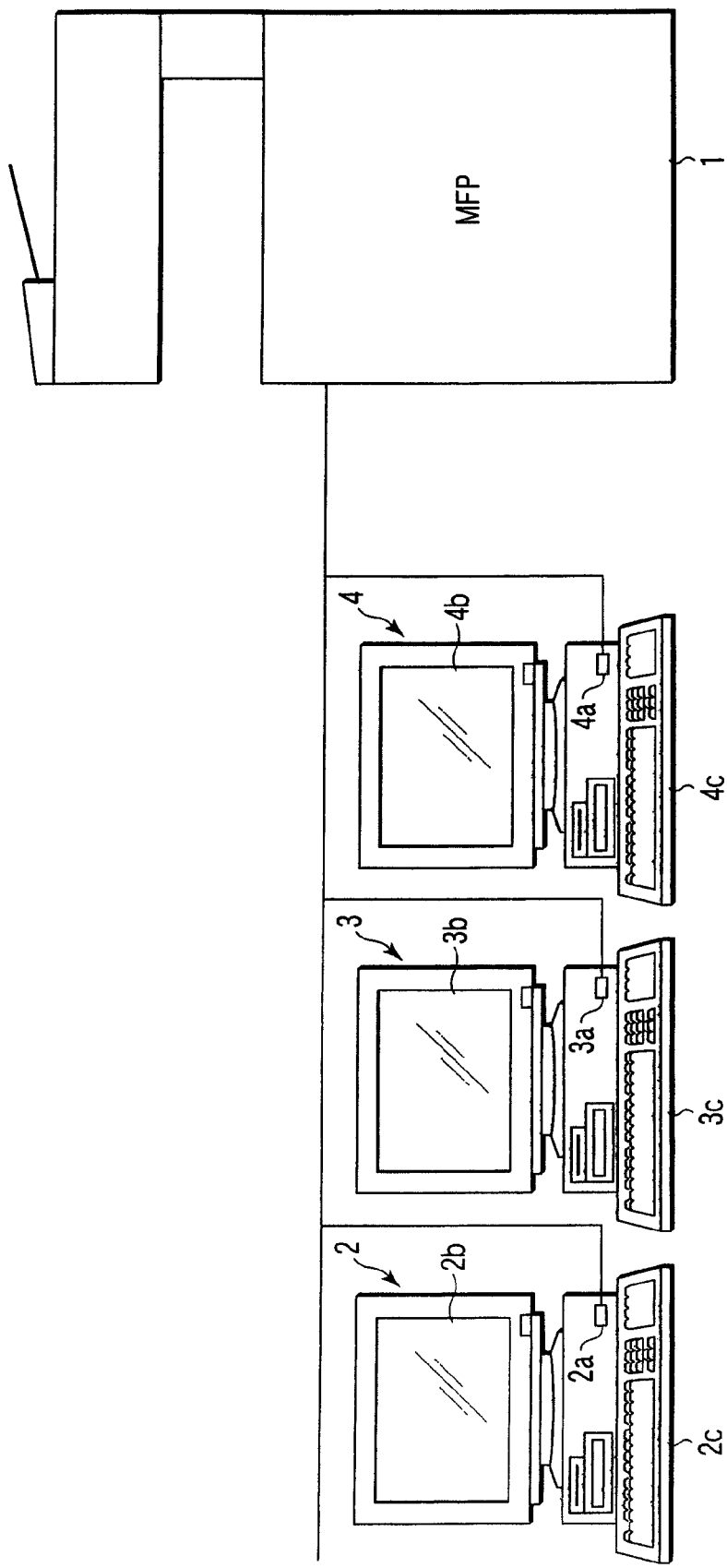
FIG. 1 is a schematic illustration of an image forming system according to embodiments of the present invention.

Hereinafter, the embodiments of the present invention will be described with reference to the drawings. FIG. 1 is a schematic illustration of an image forming system according to an embodiment of the present invention.

As shown in FIG. 1, the image forming system has a digital multiuse machine (MFP: Multi Functional Peripheral) 1 as an image forming apparatus and a plurality of personal computers (PCs) 2, 3 and 4 interconnected through a communications line 5 in a local area network (LAN).

The digital multiuse machine 1 has mainly a copy function, a printer function, a scanner function, a fax function, and so on. The printer function includes a private printing function based on print data from the PCs 2, 3 and 4 and a scheduled printing function.

The private printing function is to perform a printing operation by a user's operation on the digital multiuse machine after print data sent from an external device, such as a PC, has been stored in the digital multiuse machine 1. That is, users specify private printing at the PCs 2, 3 and 4 and then send print data to the digital multiuse machine 1.

The digital multiuse machine 1 stores the print data for which private printing has bee specified together with user data. After that, the users specify user data and print data on the operating panel of the digital multiuse machine 1 and instruct it to print.

The digital multiuse machine 1 determines if the user data specified matches the user data corresponding to the stored print data. When a match occurs in user data, the digital multiuse machine 1 prints the corresponding print data.

The scheduled printing function causes the digital multiuse machine 1 to perform a printing operation with print data and printing start time specified by an external device such as a PC. That is, the users send print data and print start time from the PCs 2, 3 and 4 to the digital multiuse machine 1. The digital multiuse machine 1 stores the print data and print start time from the PCs. The digital multiuse machine 1 makes a comparison between the current time and the print start time corresponding to the stored print data and, at the time when the print start time is reached, performs an operation of printing the corresponding print data.

The PC 2 (3, 4) is composed of a body having a network interface 2a (3a, 4a), a display device 2b (3b, 4b), an operating device 2c (3c, 4c), and so on. The network interface 2c (3c, 4c) is an interface for connection to the digital multiuse machine 1. The PC 2 (3, 4) makes data through the network interface communications with the digital multiuse machine 1.

The structure of the digital multiuse machine 1 will be described next.

Figure 2:
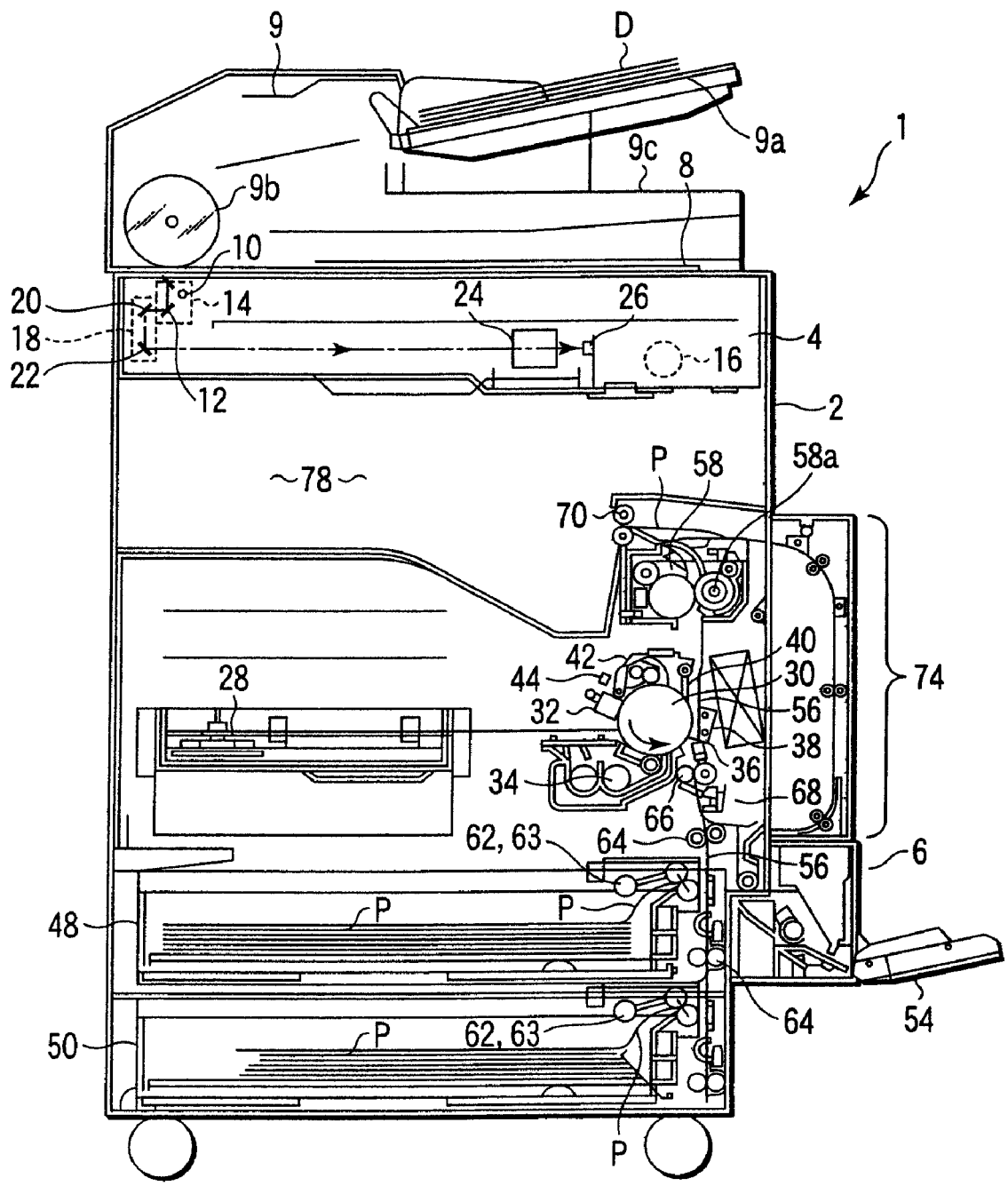
FIG. 2 is a schematic sectional view of the digital multiuse machine.

FIG. 2 is a schematic sectional view of the digital multiuse machine 1.

As shown in FIG. 2, the digital multiuse machine 1 has an apparatus body 2 which has a scanner unit 4 as readout means and a printer unit 6 serving as image forming means provided in it.

The apparatus body 2 is provided on top with a document table 8 made of transparent glass on which an object to be read, i.e., an document D, is placed. Also, on the top of the apparatus body 2 is placed an automatic document feeder 9 (hereinafter referred to as an ADF) as transport means for feeding automatically documents D onto the document table 8. The document D placed on an document tray 9a of the ADF 9 is transported by guides not shown and ejected through a platen roller 9b into a delivery tray 9c. While being transported by the platen roller 9b, the document D is exposed and scanned by an exposure lamp 10 in the scanner unit 4 to be described later, whereby an image on the document D is read.

The documents D are placed on the document tray 9a with the reading side up and fed one at a time in the order beginning with the topmost document D.

The scanner unit 4 placed in the apparatus body 2 has an exposure lamp 10 comprised of, say, a halogen lamp as a light source for illuminating the document D transported by the ADF 9 or the document D placed on the document table 8 and a first mirror 12 for deflecting reflected light from the document D in a predetermined direction. The exposure lamp 10 and the first mirror 12 are mounted on a first carriage 14 provided below the document table 8.

The first carriage 14 is placed movably parallel to the document table 8 and is reciprocated below the document table 8 by a scanner motor (driving motor) 16 through a toothed belt not shown. The scanner motor 16 is comprised of a stepping motor or the like.

Below the document table 8, a second carriage 18 which is movable parallel to the document table 8 is disposed. On the second carriage 18, second and third mirrors 20, 22 which sequentially deflect light reflected from the document D and deflected by the first mirror 12 are mounted at right angles. Rotation force from the scanner motor 16 is transmitted to the second carriage 18 via the toothed belt or the like which drives the first carriage 14 so that the second carriage will follow the first carriage 14 and can be moved parallel to the document table 8 at a speed which is half the speed of the first carriage 14.

Below the document table 8 are provided an focusing lens 24 for focusing the reflected light from the third mirror 20 on the second carriage 18 and a CCD sensor (line sensor) 26 which receives the reflected light focused by the focusing lens 24 and converts it into an electrical signal The focusing lens 24 is arranged movably through a driving mechanism in a plane including the optical axis of light deflected by the third mirror 22 to image the reflected light at a desired magnification (main scanning direction). Responsive to an image processing clock from the main CPU to be described later, the CCD sensor 26 converts the incident reflected light into an electrical signal corresponding to the read document D. The magnification in the subscanning direction can be set by changing the speed of transportation by the ADF 9 or the speed at which the first carriage 14 is moved.

In reading the document D being transported by the ADF 9, the position of illumination by the exposure lamp 10 is fixed at the position shown in FIG. 2. In reading the document D placed on the document table 8, the position of illumination by the exposure lamp 10 is moved from left to right along the document table 8.

The printer unit 6 is equipped with a laser exposure device 28 serving as a latent image forming means. The circumferential surface of a photosensitive drum 30 is scanned by laser light from the laser exposure device 28, thereby forming an electrostatic latent image on the circumferential surface of the photosensitive drum 30.

The printer unit 6 has the rotatable photosensitive drum 30 as an image bearing body placed on the right-hand side of the approximate the center of the apparatus body 2. The circumferential surface of the photosensitive drum 30 is exposed by laser light from the laser exposure device 28 and formed with an electrostatic latent image. Around the photosensitive drum 30 are placed in order an electrifying charger 32 for electrifying the drum surface to a given electric charge, a developer 34 as developing means for developing the electrostatic latent image formed on the surface of the photosensitive drum 30 at a desired image density by supplying tonor as developing powder to it, a transfer charger 38, having an integrally incorporated separation charger 36 for separating an image formed medium fed from a cassette 48 or 50 to be described later, i.e., copy paper P, from the photosensitive drum 30, for transferring the tonor image formed on the photosensitive drum 30 to the paper P, a separation claw 40 for separating the copy paper P from the surface of the photosensitive drum 30, a cleaning device 42 for removing residual tonor from the surface of the photosensitive drum 30, and a charge eliminator 44 for eliminating the charge on the surface of the photosensitive drum 30.

In the lower portion of the apparatus body 2, an upper cassette 48 and a lower cassette 50, each of which is removable from the apparatus body, are placed in a stacked form. Into each of the cassettes 48 and 50 different size of copy paper P is loaded. A manual feed tray 54 is provided at the sided the upper cassette 48.

In the apparatus body 2 a paper path 56 is formed to extend from each of the cassettes 48 and 50 through the transfer section located between the photosensitive drum 30 and the transfer charger 38. At the end of the paper path 56 is provided a fixing device 58 having a fixing lamp 58a. An exit 60 is formed above the fixing device 58.

In the vicinity of each of the upper cassette 48 and the lower cassette 50 a paper feed roller 62 and a separation roller 63 are provided which take out sheets of paper P one at a time from the cassette 48 or 50. Many paper feed roller pairs 64 are provided along the paper path 56 to transport copy paper P taken out by the paper feed roller 62 and the separation roller 63 over the path 56.

Paired register rollers 66 are provided on the upstream side of the photosensitive drum 30 in the paper path 56. The paired register rollers 66 correct any inclination in the copy paper P, bring the leading edge of the tonor image on the photosensitive drum 30 and the leading edge of the copy paper P into registration with each other, and feed the copy paper P to the transfer section at the same speed as the speed at which the circumference of the photosensitive drum 30 moves. A pre-aligning sensor 68 that detects the arrival of the copy paper P is provided short of the paired register rollers 66, namely, on the side of the paper feed rollers 64.

The copy paper sheets P, taken out one at a time from each of the cassettes 48 and 50 by the paper feed roller 62, is transported to the paired register rollers 66 by the paired paper feed rollers 64. The copy paper P, after having been accurately positioned by the paired register rollers 66, is transported to the transfer section.

In the transfer section, the developing powder image formed on the photosensitive drum 30, namely, the tonor image, is transferred to the copy paper P by the transfer charger 38. The tonor image transferred copy paper P is separated from the circumferential surface of the photosensitive drum 30 by the action of the separation charger 36 and the separation crawl 40 and carried to the fixing device 58 through a carrier belt (not shown) that forms part of the paper path 56. The developing powder image is fused onto the copy paper P by the fixing device 58 and the copy paper P is then ejected from the exit 60 into a delivery tray 72 within the apparatus body 2 by paired delivery rollers 70.

On the right-hand side of the paper path 56 is provided an automatic double-side device 74 that reverses the copy paper P passed through the fixing device 58 and feeds it again to the paper path 56.

In the front portion of the top of the apparatus body 2 is provided an operating panel (which will be described later) to instruct various copy conditions, such as copy magnification, etc., the start of copying, etc.

The internal configuration of the control system of the digital multiuse machine 1 will be described next.

Figure 3:
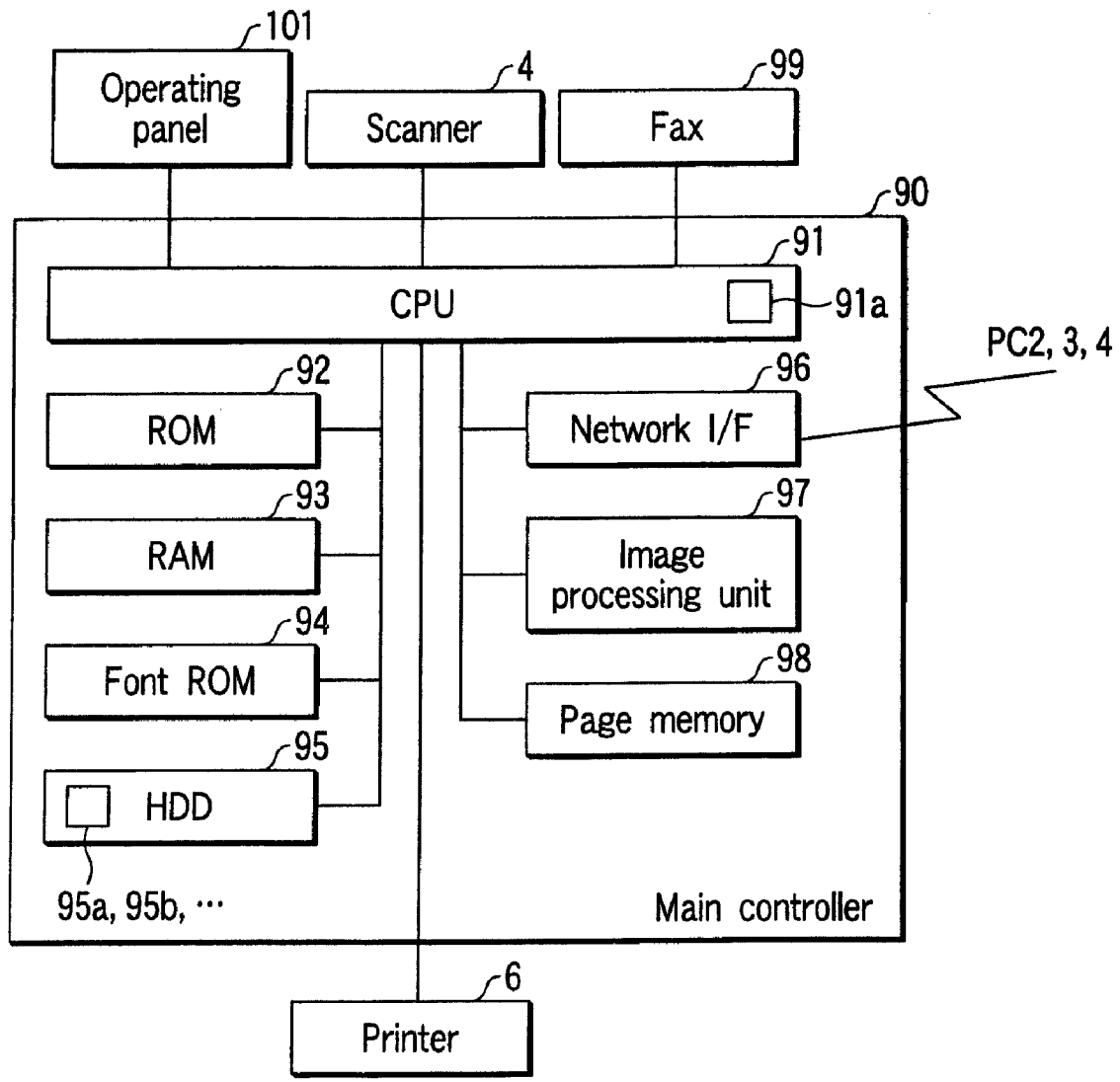
FIG. 3 is a block diagram of the control system of the digital multiuse machine.

FIG. 3 is a block diagram of the control system of the digital multiuse machine.

As shown in FIG. 3, the digital multiuse machine 1 is equipped with a main controller 90 which controls the whole. The main controller 90 is composed of a CPU (Central Processing Unit) 91, a ROM (Read Only Memory) 92, a RAM (Random Access Memory) 93, a font ROM 94, a recording device (HDD) 95, a network I/F 96, an image processing unit 97, and a page memory 98.

The CPU 91 exercises control over the whole of the digital multiuse machine 1. Also, the CPU 91 has a timer 91a that counts the current time. The ROM 92 is stored with software such as a control program for controlling the digital multiuse machine 1, etc. The RAM 93 stores temporarily operational data.

The font ROM 94 is stored with character image data corresponding to character codes. For example, upon receiving print data based on character codes from an external device, the CPU 91 converts the character codes into image data on the basis of font data stored in the font ROM 94.

The HDD 95 is a large capacity storage device. The HDD stores compressed image data and print data. The HDD 95 has a plurality of spooling areas (boxes) 95a, 95b, . . . for storing print data sent from the PCs 2, 3 and 4. These spooling areas 95a, 95b, . . . will be described later.

The network interface 96 is an interface for allowing data communications with the PCs 2, 3, and 4.

The image processing unit 97 is comprised of image processing circuitry and provides image processing such as correction or compression/decompression of image data. The page memory 98 is a memory for storing a page of image data.

To the CPU 91 are connected a scanner 4, a printer 6, a facsimile 99, and an operating panel 101. The facsimile 99 transmits and receives facsimile data over a public line. The operating panel 101 is composed of a liquid crystal display device (not shown) with a built-in touch panel, hard keys such as ten keys, etc. Operator guidance and touch keys for providing various commands are displayed on the operating panel 101.

Hereinafter, first, second and third embodiments of the image forming system will be described.

First, the first embodiment will be described.

FIG. 4 is a schematic illustration of examples of print data spooling areas (hereinafter referred to as boxes) 95a, 95b, . . . created within the HDD 95 of the digital multiuse machine 1 according to the first embodiment. In the first embodiment, the boxes 95a, 95b, . . . are created in the digital multiuse machine 1 to store print data from the respective print requesting persons. The digital multiuse machine 1 performs a process of printing print data for each of the boxes 95a, 95b, As shown in FIG. 4, the spooling areas (boxes) 95a, 95b, . . . are each formed by characteristic value in the digital multiuse machine 1. In the boxes 95a, 95b, . . . print data for scheduled printing requested by the PCs 2, 3, and 4 connected to the digital multiuse machine 1 is stored by characteristic value. The characteristic values are characteristic information for identifying users who have made requests for printing, groups to which the users belong, or PCs. For example, as the characteristic values, use is made of the user names indicating users who have made request for printing, the group names indicating groups to which the users who have made requests for printing belong, or IP addresses allocated to individual PCs to indicate PCs which have made requests for printing.

The print data stored in the boxes 95a, 95b, . . . each have a corresponding print start time stored in it. On the other hand, the CPU 91 monitors the print start times of the respective print data stored in the boxes 95a, 95b, . . . at regular intervals on the basis of the timer 91a. Thereby, the CPU 91 makes printing for each of the boxes 95a, 95b, . . . when the print start time of the print data stored in each of the boxes 95a, 95b, . . . is reached. That is, even if two or more pieces of print data on which the same print start time have been set are present in the different boxes 95a, 95b, . . . the CPU 91 will make printing for each box. This prevents the print data stored in the different boxes 95a, 95b, . . . from being printed alternately. In other words, even if two or more users with different characteristic values have set scheduled Printing appointing the same print start time, the results of printing requested by the respective users 4111 never be mixed up.

Figure 5:
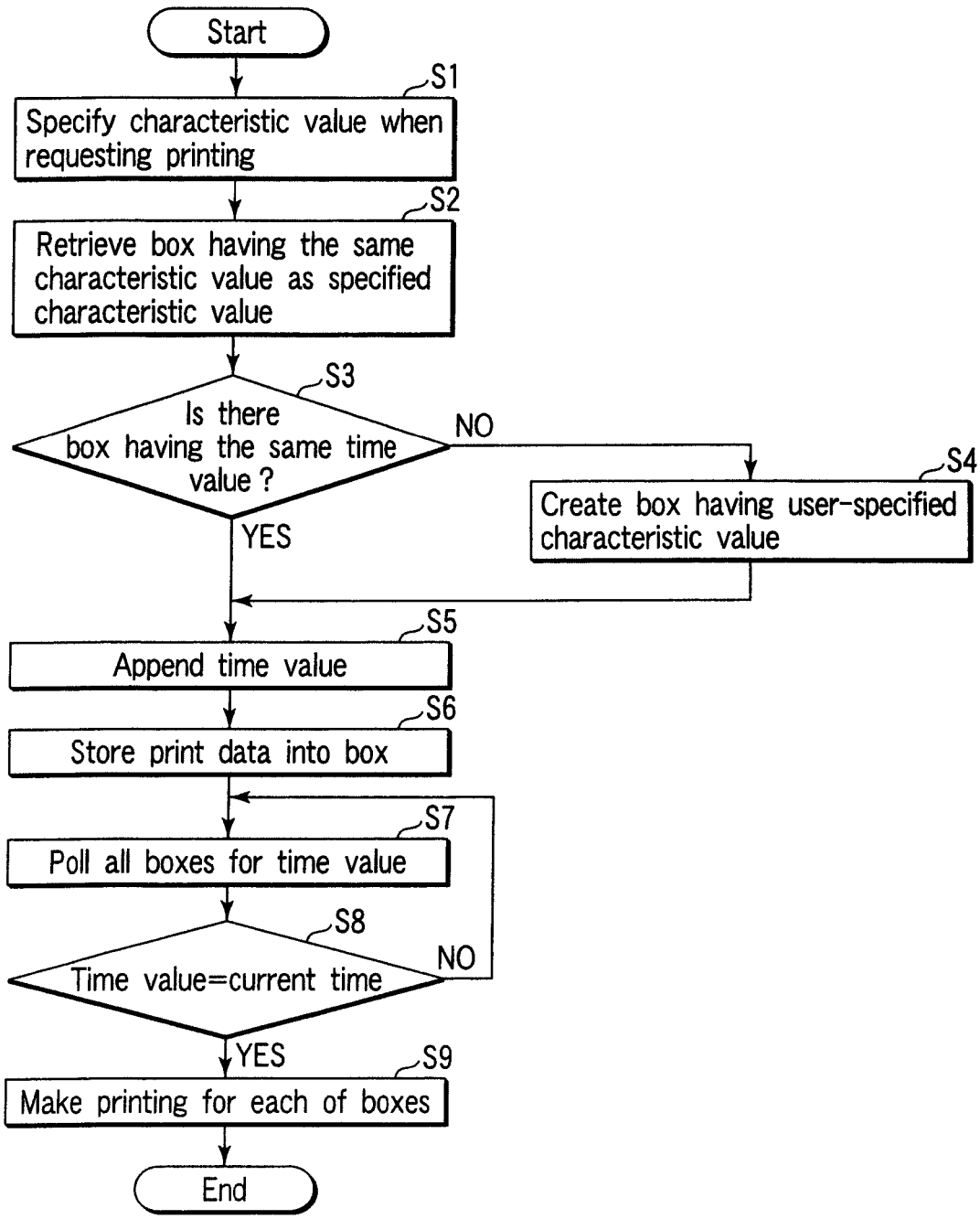
FIG. 5 is a flowchart for use in explanation of the operation of the first embodiment.

FIG. 5 is a flowchart for use in explanation of the first embodiment.

First, the user specifies print data, such as document data to be schedule printed, and a print start time through the operating device 2c (3c, 4c) of the PC 2 (3, 4). Next, the user specifies the user name, group name, IP address, or time as a characteristic value. Then, the PC 2 sends the print data, the print start time and the characteristic value specified by the user to the digital multiuse machine 1. When the digital multiuse machine 1 receives this data (step S1), the CPU 91 of the digital multiuse machine 1 retrieves from the boxes 95a, 95b, . . . in the HDD 95 a box 95a, 95b, . . . on which the characteristic value that matches the specified characteristic value has been set up (step S2).

As a result of this retrieval, if there is no box on which the same characteristic value as the characteristic value specified by the user has been set up (NO in step S3), then the CPU 91 creates a box 95a (95b, . . . ) which has the characteristic value specified by the user set up on it (step S4). When the box 95a (95b, . . . ) which has the characteristic value set up on it has been created, the CPU 91 appends the print start time (time value) specified by the user as data associated with the created box 95a (step S5). That is, each of the boxes 95a, 95b, . . . is given the characteristic value and the time value as box-associated data. When such a box 95a has been created, the CPU 91 stores the user-specified print data and print start time (time value) into the created box 95*a* so that they are associated with each other (step S6).

If the result of retrieval in step S2 indicates the presence of a box 95*a* (95*b*, . . . ) on which the same characteristic value as the characteristic value specified by the user has been set up, then the CPU 91 appends the user-specified print start time (time value) as data associated with the box 95*a* (step S5). The CPU 91 stores the print data and print start time into the retrieved box 95*a* so that they are associated with each other (step S6).

The processes in steps S1 through S6 allow print data for scheduled printing to be stored into each of the boxes 95*a*, 95*b*, . . . . In the digital multiuse machine 1 in which print data has been stored in each of the boxes 95*a*, 95*b*, in this manner, the CPU 91 monitors all the boxes 95*a*, 95*b*, . . . for time. That is, the CPU 91 polls all the boxes 95*a*, 95*b*, . . . for their time value at regular intervals of time (step S7). In this polling process, a determination is made as to whether or not the current time of the timer 91*a* coincides with the time value appended to each of the boxes 95*a*, 95*b*, . . . (step S8).

If there is no box 95*a*, 95*b*, . . . whose time value coincides with the current time, then the CPU 91 repeats the polling. If the determination is that there is a box 95*a* (95*b*, . . . ) whose time value coincides with the current time, the CPU 91 carries out printing for each of the box 95*a* (95*b*, . . . ) whose time value coincides with the current time (step S9). Thereby, the print data is arranged by a user-specified characteristic value. The results of printing are output in order for each user.

According to the first embodiment, as described above, print data for scheduled printing is stored in the boxes created by characteristic value and the printing operations for two or more pieces of print data are carried out on a box basis. Thereby, even if the same time has been set up for scheduled printing specified by different users, the results of printing for the different users are output without being mixed up. The results of printing can be processed efficiently, increasing the users' convenience.

As described above, to make printing of print data in order for each print requesting person, the digital multiuse machine can create boxes having characteristic values in a storage device to thereby store print data in order. To make printing of print data in order for each print requesting person, appending time values to individual boxes that store print data allows printing to be made automatically in order for each print requesting person without users going to the digital multiuse machine and directly operating it for printing.

Next, the second embodiment will be described.

Figure 6:
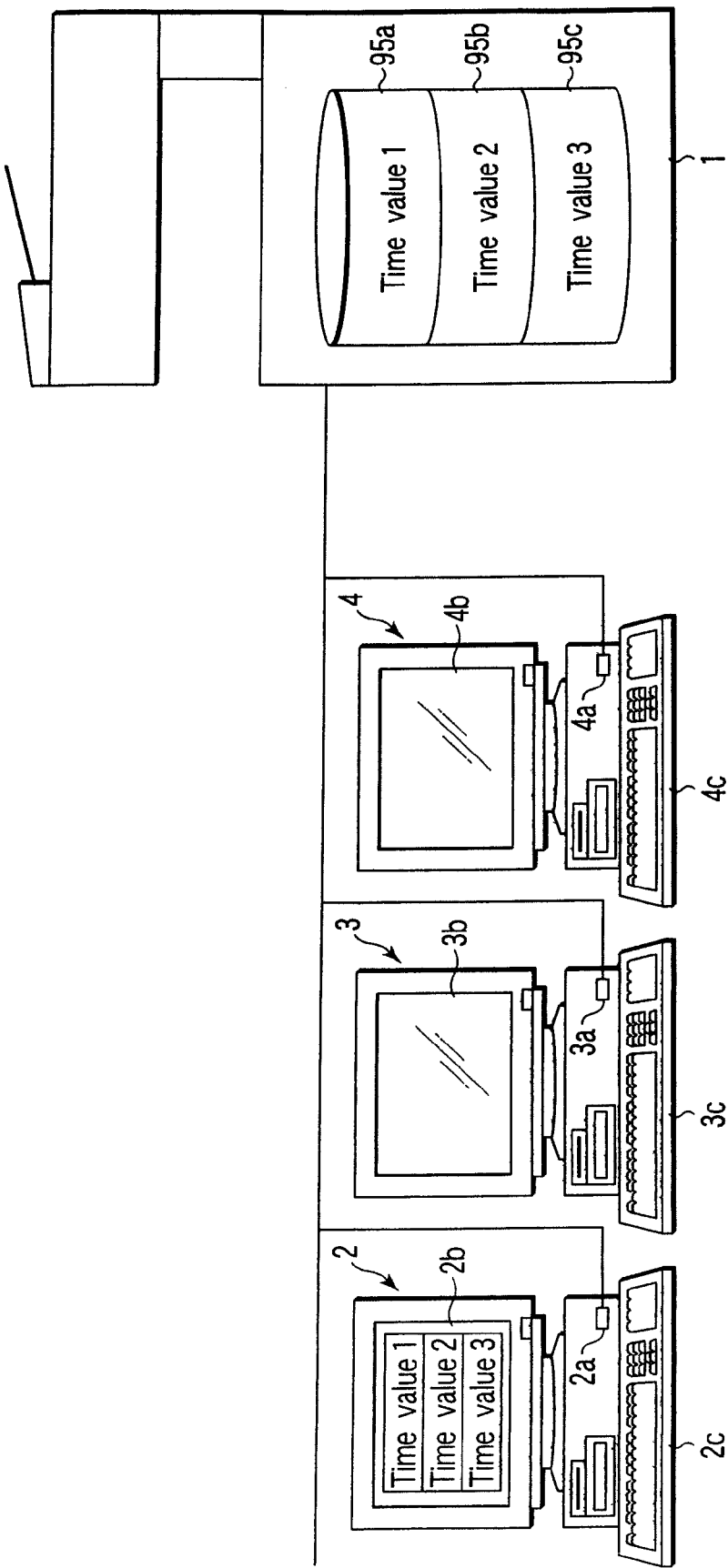
FIG. 6 is a schematic illustration of an arrangement of the HDD of the digital multiuse machine 1 according to a second embodiment.

FIG. 6 is a schematic illustration of examples of print data spooling areas (hereinafter referred to as boxes) 95*a*, 95*b*, . . . created within the HDD 95 of the digital multiuse machine 1 according to the second embodiment.

In the second embodiment, the boxes 95*a*, 95*b*, . . . are created by print start time (time value) to put print data in order for each time value. Further, the time values set up on these boxes are displayed on each of the PCs 2, 3, and 4 in order to allow each user to select a print start time from the displayed time values.

That is, as shown in FIG. 6, the spooling areas (boxes) 95*a*, 95*b*, . . . are created in the HDD 95 of the digital multiuse machine 1 by time value (print start time). Scheduled print data requested by the PCs 2, 3 and 4 are stored in these boxes 95*a*, 95*b*, . . . by time value.

The digital multiuse machine 1 monitors the print data stored in the boxes 95*a*, 95*b*, . . . at regular intervals for time values as print start times set in the boxes 95*a*, 95*b*, . . . . Thereby, the CPU 91 makes printing of print data for each of the boxes 95*a*, 95*b*, . . . when its print start time is reached.

Thereby, print data requested by two or more external devices can be stored in the boxes 95*a*, 95*b*, . . . by print start time. In other words, even if print data of different print start times is received in large quantities, it can be grouped by print start time.

In addition, the PCs 2, 3 and 4 are allowed to display the time values allocated to the boxes 95*a* created in the digital multiuse machine 1 on their respective display units 2*b*, 3*b*, and 4*b* as shown in FIG. 6. Further, a selection can be made from the time values displayed on the display units 2*b*, 3*b* and 4*b* on the PCs 2, 3 and 4 to select the print start time. Thereby, the print start time for scheduled printing can be specified with ease.

Figure 7:
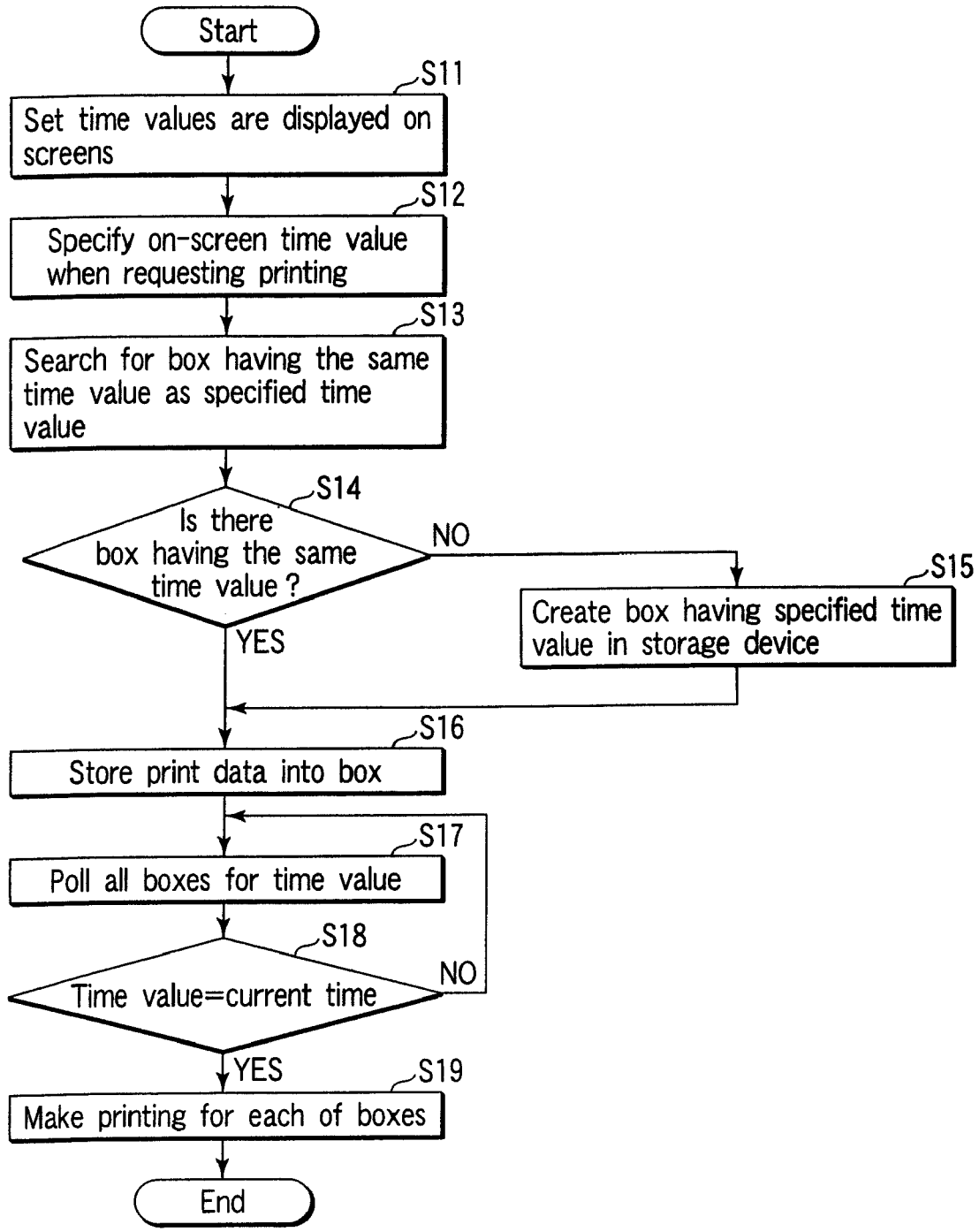
FIG. 7 is a flowchart for use in explanation of the operation of the second embodiment.

FIG. 7 is a flowchart for use in explanation of the second embodiment.

Here, a description is given of the case where the user at the PC 2 makes a request for scheduled printing. First, the time values associated with all the boxes 95*a*, 95*b*, . . . created in the display multiuse machine 1 are displayed on the PC 2 (3, 4) (step S11).

In this state, the user selects a desired print start time from the time values displayed on the display unit 2*b* through the operating device 2*c* and specifies print data, such as document data, for scheduled printing (step S12). If, at this point, a desired print start time is not displayed on the display unit 2*b*, then the user specifies the print start time through the operating device 2*c*. When the print data and the print start time (time value) have been specified in this manner, the PC 2 sends the print data and the time value to the digital multiuse machine 1.

When the digital multiuse machine 1 receives the data from the PC 2, the CPU 91 in the digital multiuse machine 1 searches the HDD 95 for a box 95*a* (95*b*, . . . ) the set time value of which matches the specified time value (step S13).

As a result of this search, if there is no box on which the same time value as the time value specified by the user has been set up (NO in step S14), then the CPU 91 creates a box 95*a* (95*b*, . . . ) which has the time value specified by the user set up on it (step S15). When the box 95*a* (95*b*, . . . ) which has the time value set up on it has been created, the CPU 91 stores the print data specified by the user into the created box 95*a* (step S16).

As a result of the search in step S13, if there is a box 95*a* (95*b*, . . . ) on which the same time value as the time value specified by the user has been set up, then the CPU 91 stores the print data into the searched box 95*a* (step S16).

The processes in steps S11 through S16 allow print data for scheduled printing to be stored into the boxes 95*a*, 95*b*, . . . by print start time. In the digital multiuse machine 1 in which print data has been stored in the boxes 95*a*, 95*b*, . . . in this manner, the CPU 91 monitors all the boxes 95*a*, 95*b*, . . . for time. That is, the CPU 91 polls all the boxes 95*a*, 95*b*, . . . for their time value at regular intervals of time (step S17). In this polling process, a determination is made as to whether or not the current time of the timer 91*a* coincides with the time value set up on each of the boxes 95*a*, 95*b*, . . . (step S18).

If the time value set up on each of the boxes 95*a*, 95*b*, . . . does not coincide with the current time, then the CPU 91 repeats the polling. If the determination is that there is a box 95*a* (95*b*, . . . ) whose time value coincides with the current time, then the CPU 91 makes printing of print data stored in that box 95*a* (95*b*, . . . ) on which the time value coincident with the current time is set up (step S19). Thereby, the print data from two or more users is stored in order of print start time and output at respective print start times.

As described above, according to the second embodiment, the digital multiuse machine stores print data for scheduled printing in boxes created by time value and each PC displays the time values for the boxes created in the digital multiuse machine and allows a desired print start time to be selected from the displayed time values. Thereby, the print start time can be specified with ease, improving users' convenience. In addition, the digital multiuse machine can arrange the print data by print start time, allowing for efficient print processing.

As described above, in carrying out printing at the same appointed time, the user can set. a print start time by making a selection from displayed time values without setting the same time every time, allowing the appointed time to be set with ease. When two or more users want to carry out printing at the same appointed time, they can set the print start time by selecting a time value from print start times set in the digital multiuse machine without each user setting a time. This allows two or more users to set print start times with ease and even to share a print start time.

Next, a third embodiment will be described.

Figure 8:
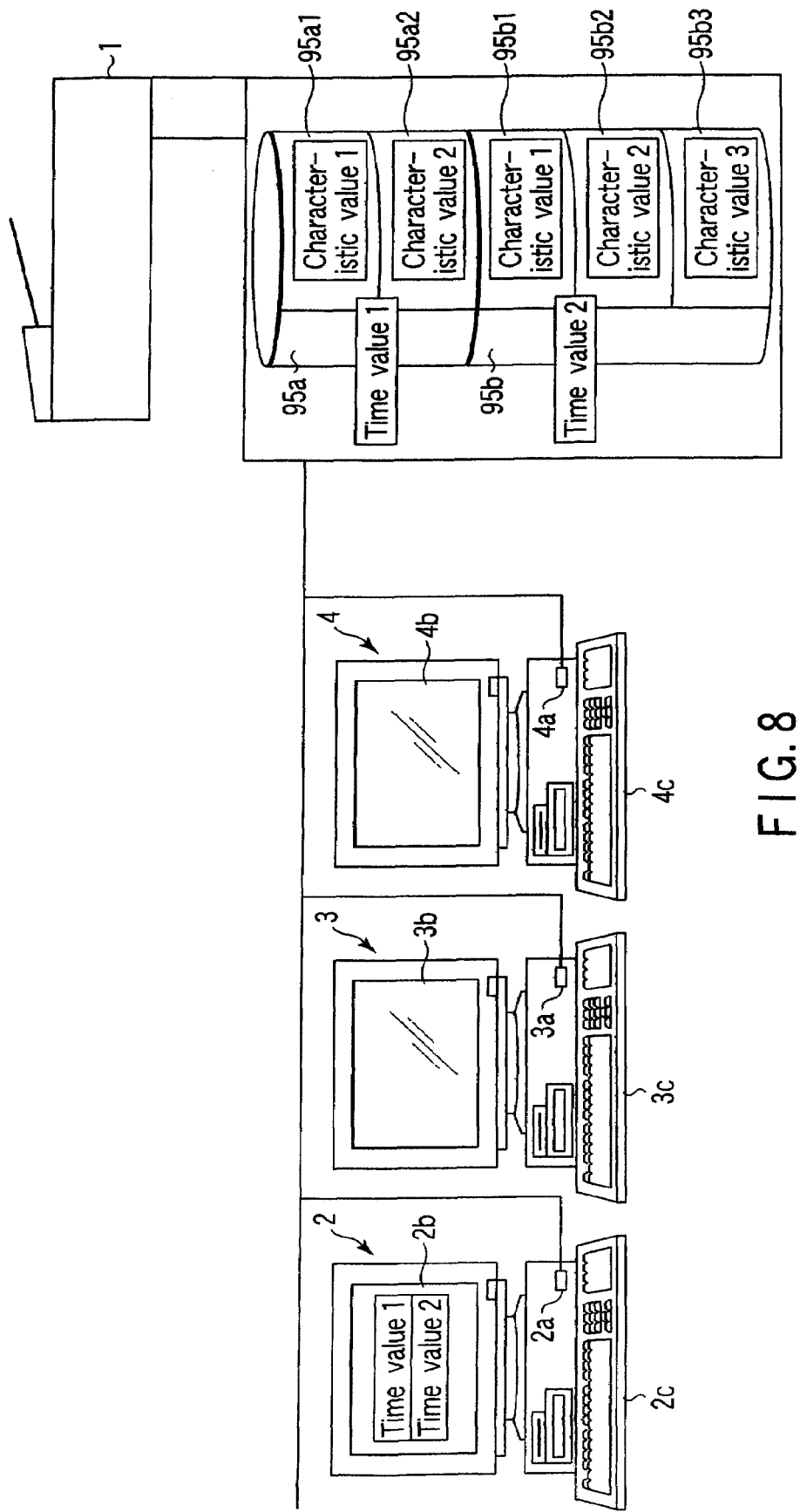
FIG. 8 is a schematic illustration of an arrangement of the HDD in the digital multiuse machine 1 according to a third embodiment.

FIG. 8 is a schematic illustration of print data spooling areas (boxes) 95a, 95b, . . . created within the HDD 95 of the digital multiuse machine 1 according to the third embodiment.

In the third embodiment, boxes 95a, 95b, . . . that store print data by print start time are created in the digital multiuse machine 1. Further, small boxes 95a1, 95a2, 95b1, are created by characteristic value in the boxes 95a, 95b, . . . . As in the second embodiment, the print start times set on the boxes 95a, 95b, . . . are displayed on each of the PCs 2, 3 and 4, allowing each user to select a print start time from the displayed time values.

That is, as shown in FIG. 8, the boxes 95a, 95b, . . . are created by time value in the HDD 95 of the digital multiuse machine 1. Further, the small boxes 95a1, 95a2, 95b1, 95b2, . . . each having a characteristic value set up on it are created in the boxes 95a, 95b, . . . . Thus, the print data is divided by time value and the print data assigned the same time value is divided by characteristic value.

The digital multiuse machine 1 monitors the time values set up on the boxes 95a, 95b, . . . at regular intervals. The digital multiuse machine 1 makes Printing of print data for each of the small boxes 95a1 and 95a2 (95b1, 95b2, . . . ) within a box 95a (95b, . . . ) alien its print start time is reached. Thereby, print data sent from two or more users can be arranged by print start time and moreover printing can be made by characteristic value such as user, group, IP, or the Like.

In addition, as in the second embodiment, the PCs 2, 3 and 4 are allowed to display the time values allocated to the boxes 95a created in the digital multiuse machine 1 on their respective display units 2b, 3b, and 4b so that a print start time is selected from the displayed time values. Thereby, the print start times for scheduled printing can be specified with ease.

Figure 9:
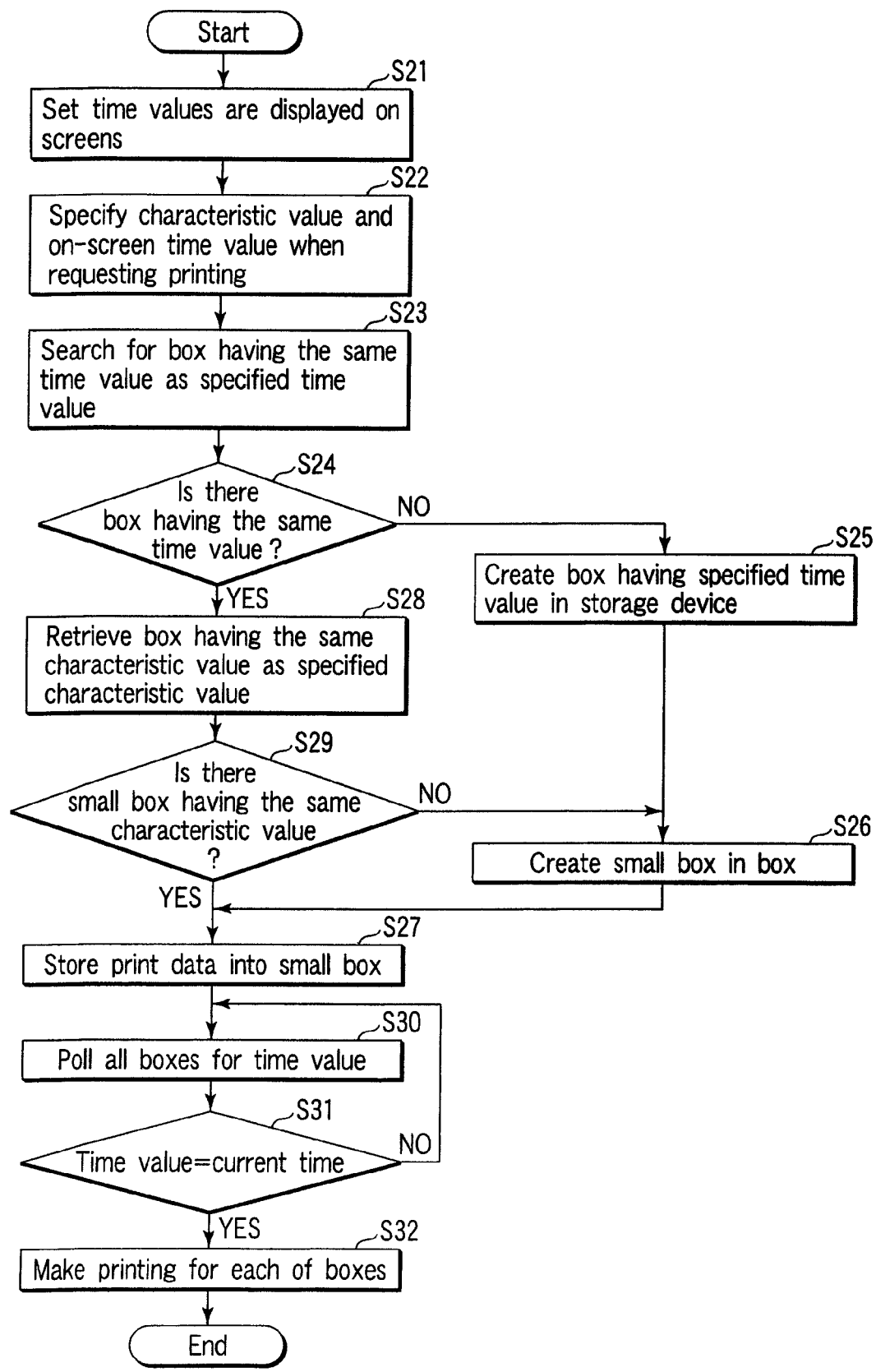
FIG. 9 is a flowchart for use in explanation of the operation of the third embodiment.

FIG. 9 is a flowchart for use in explanation of the third embodiment.

Here, a description is given of the case where the user at the PC 2 makes a request for scheduled printing. First, the time values associated with all the boxes 95a, 95b, . . . created in the display multiuse machine 1 are displayed on the PC 2 (3, 4) (step S21).

In this state, the user selects a desired print start time from the time values displayed on the display unit 2b through the operating device 2c and specifies print data for scheduled printing and a characteristic value (step S22). If, at this point, a desired print start time is not displayed on the display unit 2b, then the user specifies the print start time through the operating device 2c. When the print data, the characteristic value and the print start time (time value) have been selected, the PC 2 sends them to the digital multiuse machine 1.

When the digital multiuse machine 1 receives the data from the PC 2, the CPU 91 in the digital multiuse machine 1 searches the HDD 95 for a box 95a, 95b, . . . the set time value of which matches the user specified time value (step S23).

As a result of this search, if there is no box on which the same time value as the time value specified by the user has been set up (NO in step S24), then the CPU 91 creates a box 95a (95b, . . . ) which has the user specified time value set up on it (step S25). When the box 95a which has the time value set up on it has been created, the CPU 91 further creates a small box 95a1 (95a2) having the user specified characteristic value set up on it (step S26). When such a small box has been created, the CPU 91 stores the print data into the created box 95a1 (step S27).

As the result of the search in step S23, if there is a box 95a on which the same time value as the time value specified by the user has been set up (YES in step S24), then the CPU 91 searches the box 95a for a small box 95a1 on which the user-specified characteristic value is set up (step S28).

As the result of this search, if there is no small box on which the same characteristic value as the characteristic value specified by the user has been set up (NO in step S29), then the CPU 91 creates a small box 95a which has the user specified characteristic value set up on it in the box 95a (step S26). When such a small box 95a1 has been created, the CPU 91 stores the print data into the created small box 95a1 (step S27).

If, as the result of the search in step S23, there is a box 95a on which the same time value as the time value specified by the user has been set up and if, as the result of the search in step S28, there is a small box 95a1 on which the same characteristic value as the characteristic value specified by the user has been set up (YES in step S29), then the CPU 91 stores the print data into the small box 95a1 (step S27).

The processes in steps S21 through S29 allow print data for scheduled printing to be stored by characteristic value into each of the small boxes 95a1, 95a2, . . . within each of the boxes 95a, 95b, . . . created by time value. The CPU 91 in the digital multiuse machine 1 monitors all the boxes 95a, 95b, . . . for time.

That is, the CPU 91 polls all the boxes 95a, 95b, . . . for their time value at regular intervals of time (step S30). In this polling process, a determination is made as to whether or not the current time of the timer 91a coincides with the time value set up on each of the boxes 95a, 95b, . . . (step S31).

If no coincidence occurs between the current time and the time value set up on each of the box 95a, 95b, . . . (NO in step S31), then the CPU 91 repeats the polling. If the determination is that there is a box 95a (95b, . . . ) whose time value coincide with the current time (YES in step S31), the CPU 91 prints print data stored in the small boxes 95a1 and 95a2 in the box 95a (95b, . . . ) whose time value coincides with the current time for each small box (step S32). Thereby, the print data is arranged by time and printed by characteristic value.

According to the third embodiment, as described above, in the digital multiuse machine print data for scheduled printing are stored in small boxes by characteristic value in each of boxes created by time value and, in each PC, the time values associated with the boxes created in the digital multiuse machine are displayed and a desired print start time is selected from the displayed time values. Thereby, even if the same time has been set up on scheduled printing specified by different users, the printing can be arranged by time value in an efficient manner and the results of printing for the different users are output without being mixed with each other. The print start times can be specified with ease, increasing the users' convenience.

Thus, when two or more users appoint the same time for printing, the digital multiuse machine can arrange print data by print start time and by user, allowing printing to be made at the time specified by each user and for each user.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image forming apparatus comprising:
   a memory which includes at least one first storage area provided for a print start time;
   an interface which receives a print data in which a print start time is specified, from an external device;
   a search section which searches for the first storage area in which a set time is the same as the print start time in the print data from the external device which is received by the interface;
   and which searches, if the search section searches for the first storage area in which the set time is the same as the print start time in the print data, for a second storage area in which a set inherent value is the same as the inherent value in the print data;
   a creation section which creates a first storage area in which the print start time is to be set if the search section has not found the first storage area where the set time is the same as the print start time in the print data, and creates a second storage area in which the inherent value in the print data is to be set if the first storage area has been created or if the search section has not found an inherent value which is the same as the inherent value in the print data;
   a storing section which stores print data in the second storage area searched for by the search section and the second storage area created by the creation section, where there is at least one of the second storage area in the first storage area;
   a timer which counts the current time; and
   an image forming section which performs an image forming process to each item of print data stored in each second storage area in the first storage area if the print start time from the first storage area coincides with the current time counted by the timer.

2. An image forming method comprising:
   providing at least one first storage area for a print start time in a memory of an image forming apparatus;
   receiving, at an interface of the image forming apparatus, a print data in which a print start time is specified, from an external device;
   a first search step of searching for the first storage area in which a set time is the same as the print start time in the print data from the external device which is received by the interface;
   a second search step of searching, if the first search step searches for the first storage area in which the set time is the same as the print start time in the print data, for a second storage area in which a set inherent value is the same as the inherent value in the print data;
   a first creation step of creating a first storage area in which the print start time is to be set, if the first search step has not found the first storage area where the set time is the same as the print start time in the print data;
   a second creation step of creating a second storage area in which the inherent value in the print data is to be set if the first storage area has been created or if the second search step has not found an inherent value which is the same as the inherent value in the print data;
   a storing step stores print data in the second storage area searched for by the second search step and the second storage area created by the second creation step, where there is at least one of the second storage area in the first storage area;
   counting the current time; and
   a performing an image forming process step performs an image forming process to each item of print data stored in each second storage area in the first storage area if the print start time.

3. The apparatus of claim 1, the inherent value is any one of a print request person, a group containing a person or information specifying the external device.

4. The method of claim 2, the inherent value is any one of a print request person, a group containing a person or information specifying the external device.

5. An image forming apparatus comprising:
   a memory which includes at least one first storage area provided for a print start time;
   an interface means for receiving a print data in which a print start time is specified, from an external device;
   a search means for searching for the first storage area in which a set time is the same as the print staff time in the print data from the external device which is received by the interface means
   and for searching, if the search means searches for the first storage area in which the set time is the same as the print staff time in the print data, for a second storage area in which a set inherent value is the same as the inherent value in the print data;
   a creation means for creating a first storage area in which the print start time is to be set if the search means has not found the first storage area where the set time is the same as the print start time in the print data and
   for creating a second storage area in which the inherent value in the print data is to be set if the first storage area has been created or if the search means has not found an inherent value which is the same as the inherent value in the print data;
   a storing means which stores print data in the second storage area searched for by the search means and the second storage area created by the creation means, where there is at least one of the second storage area in the first storage area;
   a counting means for counting the current time; and
   an image forming means which performs an image forming process to each item of print data stored in each second storage area in the first storage area if the print staff time from the first storage area coincides with the current time counted by the counting means.

6. The apparatus of claim 5, the inherent value is any one of a print request person, a group containing a person or information specifying the external device.

* * * * *

UNITED STATES PATENT AND TRADEMARK OFFICE
CERTIFICATE OF CORRECTION

| | | |
|---|---|---|
| PATENT NO. | : 7,710,584 B2 | Page 1 of 1 |
| APPLICATION NO. | : 11/957762 | |
| DATED | : May 4, 2010 | |
| INVENTOR(S) | : Masahide Teranoshita | |

It is certified that error appears in the above-identified patent and that said Letters Patent is hereby corrected as shown below:

ON THE TITLE PAGE, item:

(45)   Date of Patent: *May 4, 2010

(*)    This patent is subject to a terminal disclaimer.

Signed and Sealed this

Thirty-first Day of August, 2010

David J. Kappos
*Director of the United States Patent and Trademark Office*